US009686730B2

(12) United States Patent
Dai et al.

(10) Patent No.: US 9,686,730 B2
(45) Date of Patent: Jun. 20, 2017

(54) DATA FORWARDING METHOD, DEVICE, AND COMMUNICATIONS SYSTEM

(71) Applicant: Huawei Technologies Co., Ltd., Shenzhen (CN)

(72) Inventors: Mingzeng Dai, Shanghai (CN); Yi Guo, Shanghai (CN); Qinghai Zeng, Shanghai (CN); Hongping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 14/539,750

(22) Filed: Nov. 12, 2014

(65) Prior Publication Data

US 2015/0071250 A1 Mar. 12, 2015

Related U.S. Application Data

(63) Continuation of application No. PCT/CN2013/075840, filed on May 17, 2013.

(30) Foreign Application Priority Data

May 18, 2012 (CN) .......................... 2012 1 0155172

(51) Int. Cl.
*H04W 36/38* (2009.01)
*H04W 36/00* (2009.01)
*H04W 36/28* (2009.01)

(52) U.S. Cl.
CPC ....... *H04W 36/38* (2013.01); *H04W 36/0055* (2013.01); *H04W 36/0033* (2013.01); *H04W 36/0072* (2013.01); *H04W 36/28* (2013.01)

(58) Field of Classification Search
CPC ..... H04W 36/30; H04W 36/04; H04W 36/08; H04W 36/12; H04B 7/2643
See application file for complete search history.

(56) References Cited

U.S. PATENT DOCUMENTS

2010/0303039 A1* 12/2010 Zhang .................. H04L 5/0035
370/331
2012/0004483 A1 1/2012 Jan et al.
2012/0044836 A1 2/2012 Sivavakeesar et al.

FOREIGN PATENT DOCUMENTS

CN 101808373 A 8/2010
CN 101938794 A 1/2011
(Continued)

OTHER PUBLICATIONS

"3$^{rd}$ Generation Partnership Project; Technical Specification Group Radio Access Network; Evolved Universal Terrestrial Radio Access Network (E-UTRAN); X2 application protocol (X2AP) (Release 11)," 3GPP TS 36.423, V11.0.0, pp. 1-134, 3$^{rd}$ Generation Partnership Project, Valbonne, France (Mar. 2012).

(Continued)

*Primary Examiner* — Chandrahas Patel
(74) *Attorney, Agent, or Firm* — Leydig, Voit & Mayer, Ltd.

(57) ABSTRACT

Embodiments of the present invention provide a data forwarding method, device, and communications system, which relate to the field of communications and can achieve accuracy and continuity of data transmission during carrier aggregation for cells between base stations. The method includes: sending, by a primary base station, a first message to a secondary base station, where the first message is used to instruct the secondary base station to perform handover, and the first message includes an identifier of a target base station; confirming, by the primary base station, that the secondary base station forwards data to the target base station; and sending, by the primary base station, a second message to a user equipment, where the second message is used to instruct the user equipment to acquire the data from (Continued)

the target base station. The embodiments of the present invention are used for data forwarding.

12 Claims, 7 Drawing Sheets

(56) References Cited

FOREIGN PATENT DOCUMENTS

| | | |
|---|---|---|
| EP | 1263253 A2 | 12/2002 |
| EP | 2296403 A1 | 3/2011 |
| EP | 2451211 A1 | 5/2012 |

OTHER PUBLICATIONS

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.1.0, pp. 1-194, $3^{rd}$ Generation Partnership Project, Valbonne, France (Mar. 2012).

\* cited by examiner

DATA FORWARDING METHOD, DEVICE, AND COMMUNICATIONS SYSTEM

CROSS-REFERENCE TO RELATED APPLICATION

This application is a continuation of International Patent Application No. PCT/CN2013/075840, filed on May 17, 2013, which claims priority to Chinese Patent Application No. 201210155172.7, filed on May 18, 2012, both of which are hereby incorporated by reference in their entireties.

TECHNICAL FIELD

The present invention relates to the field of communications, and in particular, to a data forwarding method, device, and communications system.

BACKGROUND

With development of a mobile communications system, higher quality of a service provided by the communications system is achieved. To maintain a long-term competitive advantage of the 3GPP (the 3rd Generation Partnership Project), standard formulation work for LTE-A (LTE-advanced, Long Term Evolution Advanced) as further evolution of an LTE (Long Term Evolution) technology is in progress. To further improve spectral efficiency of the communications system and data throughput of a user, a carrier aggregation (CA) technology is introduced into LTE-A. Carrier aggregation enables a user equipment (UE) to perform uplink and downlink communication by using multiple component carriers (CC) at the same time, so as to implement high-speed data transmission.

The carrier aggregation of an LTE system may roughly be divided into carrier aggregation for cells inside a base station and carrier aggregation for cells between base stations. The carrier aggregation for cells inside a base station is controlled only by one base station, and therefore is relatively easy to implement. The carrier aggregation for cells between base stations may further be divided into carrier aggregation for cells between macro base stations and carrier aggregation for cells between a macro base station and a home base station. The carrier aggregation for cells between macro base stations can improve a data throughput of a user in an edge area of a base station, so as to improve user perception. In addition to improving a data throughput of a user, the carrier aggregation for cells between a macro base station and a home base station can further offload system traffic from a macro network, and compared with a network with home base stations only, can further reduce occurrence of handovers.

During the high-speed data transmission performed by using the carrier aggregation for cells between base stations, when handover occurs on a base station that carries data, it is difficult for an existing data transmission method based on carrier aggregation to achieve accuracy and continuity of data transmission, which causes a data loss when the handover occurs, and therefore reduces use perception of a user.

SUMMARY

The present invention provides a data forwarding method, device, and communications system, which can achieve accuracy and continuity of data transmission during carrier aggregation for cells between base stations.

To achieve the foregoing objectives, the following technical solutions are used in embodiments of the present invention:

According to one aspect of the present invention, a data forwarding method is provided, relates to a primary base station, and includes:

sending, by the primary base station, a first message to a secondary base station, where the first message is used to instruct the secondary base station to perform handover, and the first message includes an identifier of a target base station;

confirming, by the primary base station, that the secondary base station forwards data to the target base station; and sending, by the primary base station, a second message to a user equipment, where the second message is used to instruct the user equipment to acquire the data from the target base station.

According to another aspect of the present invention, a data forwarding method is provided, relates to a secondary base station, and includes:

receiving, by the secondary base station, a first message sent by a primary base station, where the first message is used to instruct the secondary base station to perform handover, and the first message includes an identifier of a target base station;

receiving, by the secondary base station, a data forwarding confirmation message sent by the target base station, where the data forwarding confirmation message is used to confirm that the secondary base station forwards data to the target base station; and sending, by the secondary base station, a second message to the primary base station, where the second message is used by the primary base station to instruct a user equipment to acquire the data from the target base station.

According to another aspect of the present invention, a base station is provided, and includes:

a transmitter, configured to send a first message to a secondary base station, where the first message is used to instruct the secondary base station to perform handover, and the first message includes an identifier of a target base station; and a processor, configured to confirm that the secondary base station forwards data to the target base station; and the transmitter, further configured to send a second message to a user equipment, where the second message is used to instruct the user equipment to acquire the data from the target base station.

According to another aspect of the present invention, a base station is provided, and includes:

a receiver, configured to receive a first message sent by a primary base station, where the first message is used to instruct the base station to perform handover, and the first message includes an identifier of a target base station;

the receiver, further configured to receive a data forwarding confirmation message sent by the target base station, where the data forwarding confirmation message is used to confirm that the base station forwards data to the target base station; and a transmitter, configured to send a second message to the primary base station, where the second message is used by the primary base station to instruct a user equipment to acquire the data from the target base station.

According to still another aspect of the present invention, a communications system is provided and includes any one of the base stations described above.

In the data forwarding method, the device, and the system provided by the embodiments of the present invention, a primary base station sends a first message, which carries an identifier of a target base station, to a secondary base station, to instruct the secondary base station to perform handover; and the primary base station confirms that the secondary base station forwards data to the target base station, and sends a second message to a user equipment, to instruct the user equipment to acquire the data from the target base station. By using such a data forwarding method, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

BRIEF DESCRIPTION OF DRAWINGS

To describe the technical solutions in embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

This specification describes various aspects with reference to a terminal and/or a base station.

The terminal refers to a device that provides voice and/or data connectivity for a user, and includes a wireless terminal or a wired terminal. The wireless terminal may be a handheld device with a radio connection function, or another processing device connected to a radio modem, and may be a mobile terminal that communicates with one or more core networks by using a radio access network. For example, the wireless terminal may be a mobile phone (also referred to as a "cellular" phone) and a computer with a mobile terminal. For another example, the wireless terminal may also be a portable, pocket-sized, handheld, computer built-in, or in-vehicle mobile apparatus. For yet another example, the wireless terminal may be a mobile station (mobile station in English), an access point (access point in English), a user equipment (user equipment in English, UE for short), or the like.

The base station may be a device that communicates with the wireless terminal over an air interface in an access network by using one or more cells. For example, the base station may be a base station (base transceiver station in English, BTS for short) in GSM or CDMA, may also be a base station (NodeB) in WCDMA, and may further be an evolved NodeB (eNB or e-NodeB for short) in LTE, or a base station in an evolved network in future, which is not limited in the present invention.

In the embodiments of the present invention, a primary base station is a control base station configured to control a data forwarding process, a secondary base station refers to a base station configured to share some of data resources required by access of a user equipment in order to increase data traffic of a user or reduce interference, and a target base station refers to a base station configured to share the data resources required by the access of the user equipment after handover occurs. A mobility management entity (mobility management entity, MME for short) is a control node of an LTE access network in the 3GPP protocol, and is mainly responsible for locating of a user equipment in an idle mode, a paging process and relaying.

Figure 1:
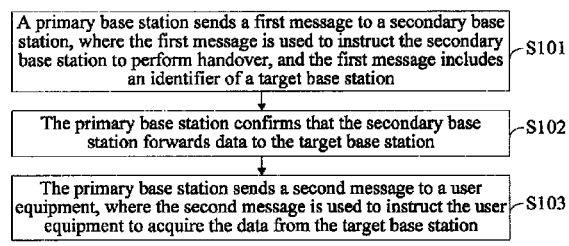
FIG. 1 is a schematic flowchart of a data forwarding method according to an embodiment of the present invention.

A data forwarding method provided by an embodiment of the present invention relates to a primary base station. As shown in FIG. 1, the method includes:

S101: The primary base station sends a first message to a secondary base station, where the first message is used to instruct the secondary base station to perform handover, and the first message includes an identifier of a target base station.

S102: The primary base station confirms that the secondary base station forwards data to the target base station.

S103: The primary base station sends a second message to a user equipment, where the second message is used to instruct the user equipment to acquire the data from the target base station.

It should be noted that, in the data forwarding method provided by the embodiment of the present invention, the primary base station and the target base station may be a same base station.

This embodiment can achieve accuracy and continuity of data transmission when two and more base stations send data to one user terminal at the same time, for example, during carrier aggregation for cells between base stations.

By using the foregoing data forwarding method, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 2:
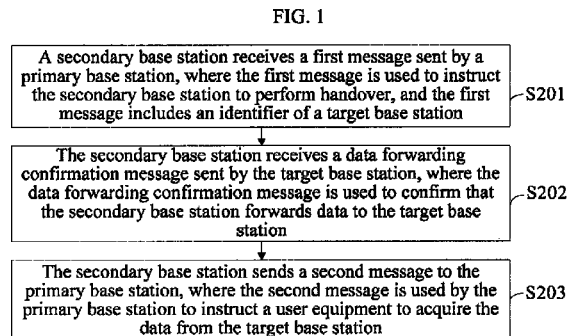
FIG. 2 is a schematic flowchart of a data forwarding method according to an embodiment of the present invention.

According to another aspect, a data forwarding method provided by an embodiment of the present invention relates to a secondary base station. As shown in FIG. 2, the method includes:

S201: The secondary base station receives a first message sent by a primary base station, where the first message is used to instruct the secondary base station to perform handover, and the first message includes an identifier of a target base station.

S202: The secondary base station receives a data forwarding confirmation message sent by the target base station, where the data forwarding confirmation message is used to confirm that the secondary base station forwards data to the target base station.

S203: The secondary base station sends a second message to the primary base station, where the second message is used by the primary base station to instruct a user equipment to acquire the data from the target base station.

By using the foregoing data forwarding method, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 3:
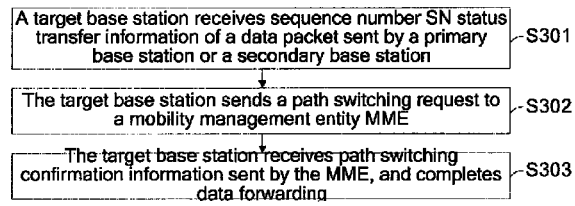
FIG. 3 is a schematic flowchart of another data forwarding method according to an embodiment of the present invention.

According to another aspect, a data forwarding method provided by an embodiment of the present invention relates to a target base station. As shown in FIG. 3, the method includes:

S301: The target base station receives sequence number SN (sequence number) status transfer information of a data packet sent by a primary base station or a secondary base station.

S302: The target base station sends a path switching request to a mobility management entity MME.

S303: The target base station receives path switching confirmation information sent by the MME, and completes data forwarding.

By using the foregoing data forwarding method, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 4:
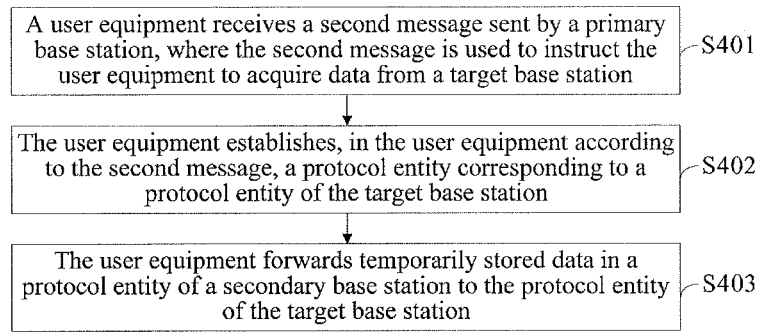
FIG. 4 is a schematic flowchart of another data forwarding method according to an embodiment of the present invention.

According to another aspect, a data forwarding method provided by an embodiment of the present invention further relates to a user equipment. As shown in FIG. 4, the method includes:

S401: The user equipment receives a second message sent by a primary base station, where the second message is used to instruct the user equipment to acquire data from a target base station.

S402: The user equipment establishes, in the user equipment according to the second message, a protocol entity corresponding to a protocol entity of the target base station.

S403: The user equipment forwards temporarily stored data in a protocol entity of a secondary base station to the protocol entity of the target base station.

By using the foregoing data forwarding method, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 5:
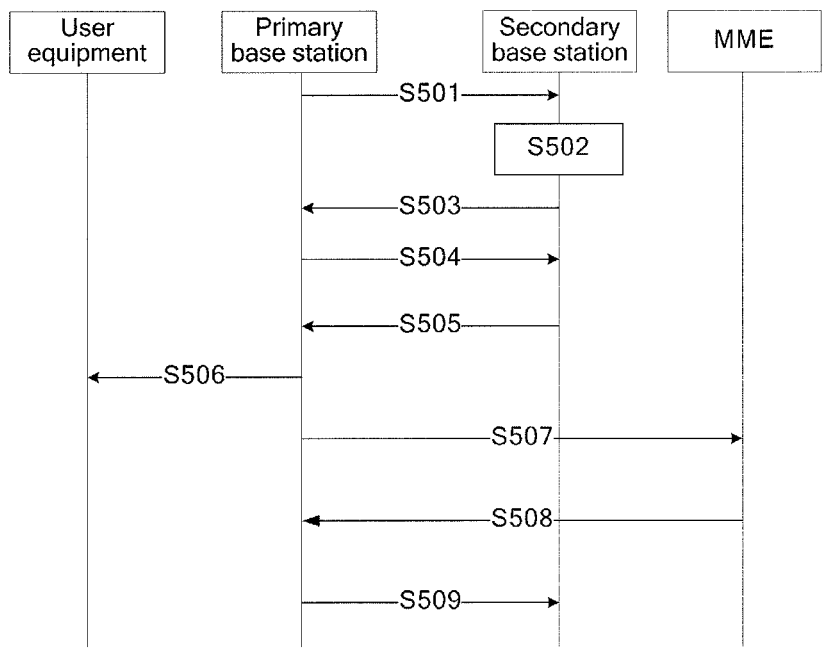
FIG. 5 is a schematic signaling flowchart of a data forwarding method according to an embodiment of the present invention.

As shown in FIG. 5, an embodiment of the present invention further provides specific descriptions of the foregoing data forwarding method embodiments, including:

S501: A primary base station sends a first message to a secondary base station, where the first message is used to instruct the secondary base station to perform handover, and the first message includes an identifier of a target base station.

For example, in any one of the following cases, the primary base station determines that the secondary base station needs to perform the handover, and the primary base station sends the first message to the secondary base station:

When the primary base station confirms that signal quality of the secondary base station is less than a preset threshold, the primary base station sends the first message to the secondary base station. For example, when an RSRP (reference signal received power) of the secondary base station that is reported by a user equipment is less than the preset threshold, the primary base station may determine that the secondary base station needs to perform the handover, and the primary base station sends the first message to the secondary base station.

Alternatively, when the primary base station receives a radio access bearer handover request sent by the secondary base station, the primary base station sends the first message to the secondary base station. For example, when the secondary base station detects that the secondary base station is overloaded, the secondary base station may take the initiative in sending a handover request to the primary base station, so that the primary base station determines that the secondary base station needs to perform the handover, and the primary base station sends the first message to the secondary base station.

Alternatively, when the primary base station confirms that a radio link connection between the user equipment and the secondary base station fails, the primary base station sends the first message to the secondary base station. For example, when the primary base station receives a secondary base station radio link failure indication reported by the user equipment, and for another example, when the primary base station receives a radio link failure indication sent by the secondary base station, the primary base station may determine that the secondary base station needs to perform the handover, and the primary base station sends the first message to the secondary base station.

Further, the sending, by a primary base station, a first message to a secondary base station includes:

determining, by the primary base station, that the secondary base station performs handover on some of radio access bearers, and sending a radio access bearer handover message to the secondary base station, so that the secondary base station hands over the some of the radio access bearers to the target base station, where the radio access bearer handover message includes identifiers of the some of the radio access bearers, the radio access bearer handover message may further include the identifier of the target base station, and this identifier may include a base station ID (identity, identity), a global base station ID, a cell ID, or a global cell ID; or determining, by the primary base station, that the secondary base station performs handover on all radio access bearers, and sending a secondary base station handover command to the secondary base station, so that the secondary base station hands over all the radio access bearers to the target base station; for example, if the primary base station determines to hand over all the radio access bearers on the secondary base station to the target base station, the radio access bearer handover message may be replaced with the secondary base station handover command, and when receiving a base station handover command, the secondary base station considers that all the radio access bearers need to be handed over.

In the embodiment of the present invention, the target base station and the primary base station may be a same base station.

S502: The secondary base station stops transmission of uplink and downlink data.

For example, after the secondary base station receives the first message sent by the primary base station, when the secondary base station determines that the secondary base station has temporarily stored uplink and downlink data or has uplink and downlink data that is not authenticated by the user equipment, the transmission of the uplink and downlink data is immediately stopped.

S503: The secondary base station sends a data forwarding request message to the primary base station, where the data forwarding request message is used to request data forwarding from the primary base station, and the data forwarding request message includes information that instructs the primary base station to perform downlink forwarding and/or uplink general packet radio service Tunneling Protocol GTP endpoint information of the secondary base station.

For example, if the secondary base station determines to propose forwarding of the downlink data by the primary base station, an instruction of the proposed forwarding of the downlink data is included for the primary base station. If the primary base station determines to propose forwarding of the uplink data, an uplink GTP endpoint is sent to the primary base station. Optionally, the secondary base station may add configuration information to the message to the primary base station, so that the primary base station determines whether to continue to use a same configuration, where the configuration information may include a MAC (medium access control, medium access control) configuration parameter, an RLC (radio link control, radio link control) configuration parameter, or the like of a bearer. For example, when the MAC configuration parameter of the bearer is not changed, the primary base station may continue to carry data by using this configuration.

S504: The secondary base station receives a data forwarding confirmation message sent by the primary base station, where the data forwarding confirmation message is used to confirm that the secondary base station forwards data to the primary base station.

The primary base station confirms that the secondary base station forwards the data to the primary base station itself.

For example, after receiving the data forwarding request message, the primary base station determines whether the data forwarding is allowed. If the primary base station allows the data forwarding, the primary base station sends the data forwarding confirmation message to the secondary base station, where the message may carry GTP endpoint information of the primary base station.

S505: The primary base station receives SN status transfer information of a data packet sent by the secondary base station.

For example, after the secondary base station receives the data forwarding confirmation message sent by the primary base station, the secondary base station indicates, in the SN status transfer information of the data packet, a sequence number list used for the bearer to forward the data, where the list helps the primary base station notify in advance the user equipment of an uplink data packet that does not need to be retransmitted or helps the primary base station determine a downlink packet that needs to be sent again by using a radio interface. A data forwarding GTP tunnel is established according to the GTP endpoint information, and the secondary base station forwards, to the primary base station, received out-of-order uplink data and/or downlink data that has not been confirmed by the user equipment.

S506: The primary base station sends a second message to the user equipment, where the second message is used to instruct the user equipment to acquire the data from the target base station.

Specifically, the primary base station delivers the second message to the user equipment, where the second message may be a radio resource control connection reconfiguration message (RRC Connection Reconfiguration), and the second message may include an instruction of handing over a radio access bearer from the secondary base station to the primary base station.

S507: The primary base station sends a path switching request to a mobility management entity MME.

A radio access bearer handover instruction may be added to the message, and the MME forwards the instruction to a serving gateway S-GW (serving gateway). After receiving the instruction, the MME and the S-GW perform path switching only on a corresponding radio access bearer, and other radio access bearers are not affected. For example, the other radio access bearers do not release an S1 connection between the MME and the primary base station.

S508: The primary base station receives path switching confirmation information sent by the MME, and completes the data forwarding.

S509: The primary base station sends a handover success message to the secondary base station, so that the secondary base station releases carried data.

For example, after receiving the handover success message, the secondary base station releases configurations of the RLC, MAC, or PDCP (Packet Data Convergence Protocol).

Figure 6:
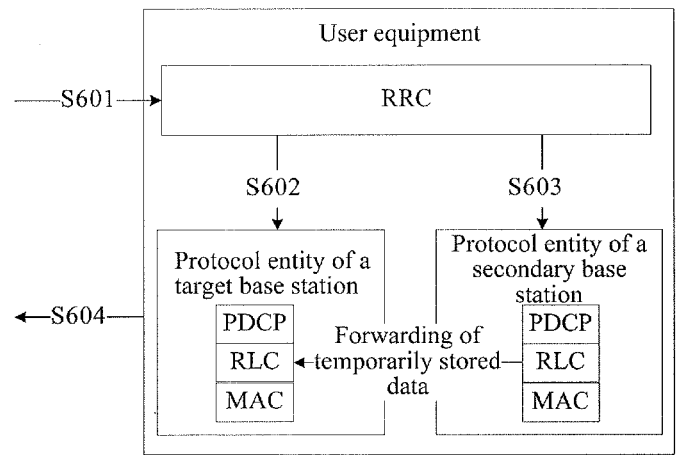
FIG. 6 is a schematic flowchart of internal operations of a user equipment in a data forwarding method according to an embodiment of the present invention.

In this embodiment, after the user equipment receives the second message, specific internal operations may be shown in FIG. 6.

S601: The user equipment receives the second message sent by the primary base station, where the second message is used to instruct the user equipment to acquire the data from the target base station.

An RRC (radio resource control, radio resource control) layer of the user equipment receives the second message sent by the primary base station, where the second message may be a radio resource reconfiguration message, and the RRC layer of the user equipment may configure, according to the radio resource reconfiguration message, a protocol entity used for carrying a radio resource.

S602: The user equipment establishes, in the user equipment according to the second message, a protocol entity corresponding to a protocol entity of the target base station.

S603: The user equipment forwards temporarily stored data in a protocol entity of the secondary base station to the protocol entity of the target base station.

It should be noted that, the protocol entity may be at least one of a PDCP protocol entity, an RLC (Radio Link Control) protocol entity, or a MAC (Medium Access Control, medium access control) protocol entity.

Optionally, the internal operations of the user equipment may further include:

S604: The user equipment sends RRC connection reconfiguration completion information to the primary base station.

By using the foregoing data forwarding method, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 7:
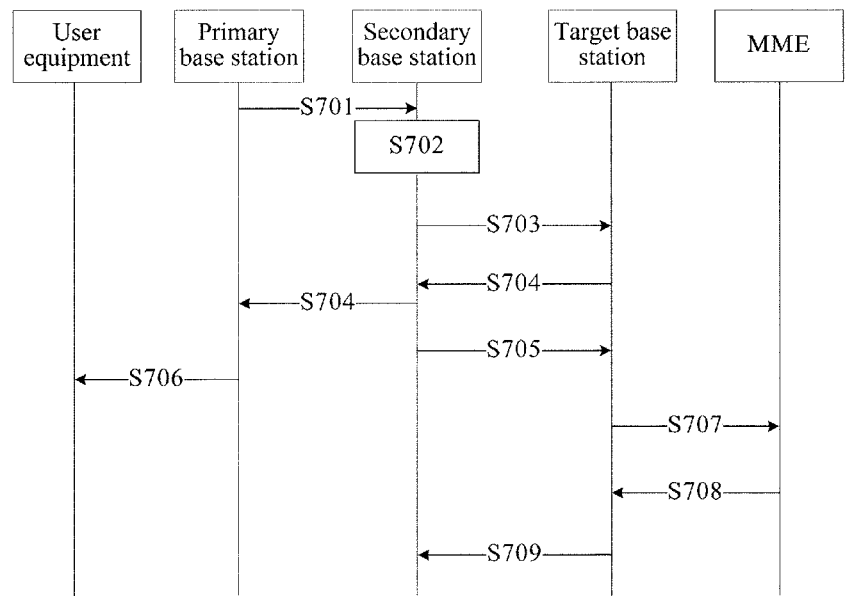
FIG. 7 is a schematic signaling flowchart of another data forwarding method according to an embodiment of the present invention.

As shown in FIG. 7, this embodiment further provides specific descriptions of the foregoing embodiments, including:

S701: The primary base station sends the first message to the secondary base station, where the first message is used to instruct the secondary base station to perform handover, and the first message includes the identifier of the target base station.

S702: The secondary base station stops the transmission of the uplink and downlink data.

For the foregoing steps, reference may be made to the foregoing embodiments, and details are not described herein again.

S703: The secondary base station sends the data forwarding request message to the target base station, where the data forwarding request message is used to request data forwarding from the target base station, and the data forwarding request message includes information that instructs the target base station to perform downlink forwarding and/or the uplink general packet radio service Tunneling Protocol GTP endpoint information of the secondary base station.

Different from the foregoing embodiments, the target base station and the primary base station may not be a same base station in the embodiment of the present invention.

S704: The secondary base station receives a data forwarding confirmation message sent by the target base station, where the data forwarding confirmation message is used to confirm that the secondary base station forwards the data to the target base station.

The primary base station confirms that the secondary base station forwards the data to the primary base station.

For example, after receiving the data forwarding request message, the target base station determines whether the data forwarding is allowed. If the target base station allows the data forwarding, the target base station sends the data forwarding confirmation message to the secondary base station, where the message may carry GTP endpoint information of the target base station.

S705: The target base station receives the SN status transfer information of the data packet sent by the secondary base station.

For example, after the secondary base station receives the data forwarding confirmation message sent by the target base station, the secondary base station indicates, in the SN status transfer information of the data packet, the sequence number list used for the bearer to forward the data, where the list helps the target base station notify in advance the user equipment of the uplink data packet that does not need to be retransmitted or helps the target base station determine the downlink packet that needs to be sent again by using the radio interface. The data forwarding GTP tunnel is established according to the GTP endpoint information, and the secondary base station forwards, to the target base station, the received out-of-order uplink data and/or the downlink data that has not been confirmed by the user equipment.

S706: The primary base station sends the second message to the user equipment, where the second message is used to instruct the user equipment to acquire the data from the target base station.

The second message may be an RRC connection reconfiguration message, where the message may carry the radio access bearer handover instruction. For the specific internal operations performed after the user equipment receives the radio access bearer handover instruction, reference may be made to the foregoing FIG. 6, and details are not described herein again.

S707: The target base station sends the path switching request to the mobility management entity MME.

The radio access bearer handover instruction may be added to the message, and the MME forwards the instruction to a S-GW. After receiving the instruction, the MME and the S-GW perform the path switching only on the corresponding radio access bearer, and the other radio access bearers are not affected. For example, the other radio access bearers do not release the S1 connection between the MME and the primary base station.

S708: The target base station receives the path switching confirmation information sent by the MME, and completes the data forwarding.

S709: The target base station sends the handover success message to the secondary base station, so that the secondary base station releases the carried data.

For example, after receiving the handover success message, the secondary base station releases the configurations of the RLC, MAC, or PDCP.

By using the foregoing data forwarding method, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 8:
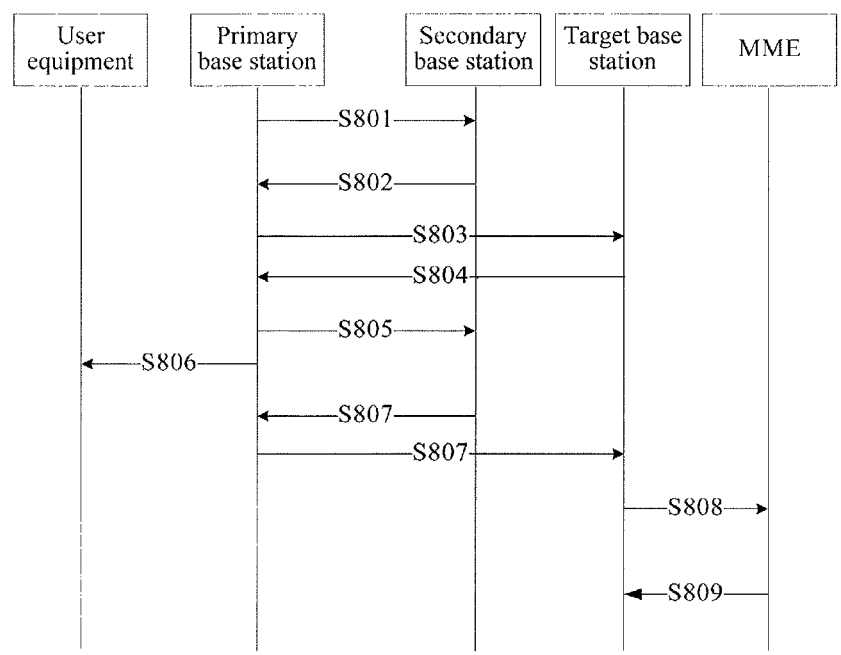
FIG. 8 is a schematic signaling flowchart of another data forwarding method according to an embodiment of the present invention.

A data forwarding method provided by an embodiment of the present invention is shown in FIG. 8. In this embodiment, a primary base station is changed (the primary base station is handed over to a target base station), meanwhile, the primary base station requests a secondary base station to change, and an anchor of data forwarding is placed on the primary base station. The method includes:

determining, by the primary base station, handover to the target base station;

sending, by the primary base station, a request message to the secondary base station, where the request message is used to request the secondary base station to perform data forwarding; and receiving, by the primary base station, a confirmation message sent by the secondary base station, where the confirmation message includes at least one piece of the following information: information that instructs the primary base station to perform downlink data forwarding, and uplink general packet radio service Tunneling Protocol GTP endpoint information of the secondary base station for performing uplink data forwarding.

The method may further include:

S801: When determining that the secondary base station needs to be handed over or deactivated, the primary base station sends a data query command to the secondary base station. Factors that affect the handover determining are load, a service, signal quality, and the like.

For example, if the primary base station determines to hand over or deactivate the secondary base station, the primary base station sends the data query command to the secondary base station, where the data query command may include an indirect forwarding instruction.

S802: When determining, according to the data query command, that the secondary base station needs to be deactivated, the secondary base station sends a data forwarding confirmation message to the primary base station, where the data forwarding confirmation message is used to request data forwarding from the primary base station, and includes information that instructs the primary base station to perform downlink forwarding and/or uplink general packet radio service Tunneling Protocol GTP endpoint information of the secondary base station.

For example, after receiving a data forwarding query command, the secondary base station determines whether there is uplink and downlink data that needs to be forwarded to the target base station. A determining basis may be at least one of the following cases: whether there is temporarily stored uplink and downlink data; whether there is a downlink PDCP service data unit (service data unit, SDU for short) that has not been confirmed by a UE; and whether there is an uplink PDCP SDU that has not been correctly sorted. If the secondary base station determines to propose forwarding of the downlink data, an instruction of the proposed forwarding of the downlink data is included for the primary base station. If the secondary base station determines to propose forwarding of the uplink data, an uplink GTP endpoint is sent to the primary base station.

S803: The primary base station sends a handover request message to the target base station.

The information that instructs the primary base station to perform downlink forwarding and/or the uplink general packet radio service Tunneling Protocol GTP endpoint information of the secondary base station that are received by the primary base station may be brought to the target base station in the handover request message.

Optionally, when the primary base station sends the handover request message, a correspondence between a radio bearer and the secondary base station may be carried to the target base station. The correspondence may be presented in a form of a list or a bitmap, and specifically may include a binding relationship or a mapping relationship between an identifier of a secondary base station and an identifier of a radio bearer, so as to indicate that a radio bearer or some radio bearers belong to the secondary base station.

S804: The primary base station receives a handover confirmation message sent by the target base station.

S805: The primary base station delivers a base station handover command to the secondary base station, to instruct the secondary base station to stop transmission of uplink and downlink data and perform data forwarding, so that the secondary base station forwards data to the primary base station.

For example, the primary base station receives a handover request confirmation message from the target base station, where the message includes uplink and downlink GTP endpoints of data forwarding that is carried by the secondary base station; and sends the base station handover command to the secondary base station, where this command may include an instruction of starting the data forwarding and GTP endpoint information of the primary base station. After receiving the instruction of starting the data forwarding, the secondary base station may stop sending or scheduling the uplink and downlink data.

S806: The primary base station sends a second message to a user equipment, where the second message is used to instruct the user equipment to perform radio bearer handover.

For example, the primary base station delivers a handover command to the user equipment. This command may be a radio resource control connection reconfiguration message (RRC Connection Reconfiguration), where the message may include an instruction of handing over a radio bearer from the secondary base station to the target base station. After receiving the handover command, the user equipment establishes a new PDCP layer for the radio bearer in a protocol stack corresponding to a protocol stack of the target base station, and forwards a disordered PDCP SDU in a PDCP reordering buffer of this bearer in a protocol stack corresponding to a protocol stack of the secondary base station to the newly established PDCP layer. After the forwarding is completed, the user equipment can release a PDCP layer corresponding to the protocol stack of the secondary base station.

For the specific internal operations performed after the user equipment receives a radio access bearer handover instruction, reference may be made to the foregoing FIG. 6, and details are not described herein again.

S807: The target base station receives SN status transfer information sent by the primary base station. In the embodiment of the present invention, the primary base station as a data forwarding target is handed over to the target base station, and therefore the SN status transfer information sent by the secondary base station is sent to the primary base station, and then forwarded by the primary base station to the target base station.

In this embodiment, the secondary base station indicates, to the primary base station in an SN Status Transfer message, a sequence number list used for the bearer to forward the data, where the list helps the target base station notify in advance a user terminal of an uplink data packet that does not need to be retransmitted or helps a target terminal determine a downlink packet that needs to be sent again by using a radio interface. A data forwarding GTP tunnel is established according to the GTP endpoint information, and the primary base station forwards, to the target base station, a received out-of-order uplink PDCP SDU and/or a downlink PDCP SDU that has not been confirmed by the user terminal.

Optionally, after receiving the handover request message, and when agreeing to forward the data to a bearer of the secondary base station, the target base station sends an SN status query command corresponding to the bearer to the secondary base station. After receiving a data forwarding confirmation message sent by the primary base station, the secondary base station indicates, to the target base station in an SN Status Transfer message, a sequence number list used for the bearer to forward the data.

In this embodiment, after the primary base station sends the SN status transfer information to the target base station, the secondary base station forwards the data to the primary base station, and the primary base station subsequently forwards the data to the target base station, to complete a data forwarding process.

S808: The target base station sends a path switching request to a mobility management entity MME.

The radio access bearer handover instruction may be added to the message, and the MME forwards the instruction to a signaling gateway S-GW. After receiving the instruction, the MME and the S-GW perform the path switching only on a corresponding radio access bearer, and other radio access bearers are not affected. For example, the other radio access bearers do not release an S1 connection between the MME and the primary base station.

S809: The target base station receives path switching confirmation information sent by the MME, and completes the data forwarding.

Such a data forwarding method is applicable to data forwarding when activation/deactivation occurs or handover occurs in the case of carrier aggregation for cells between base stations, which avoids a data loss when the activation/deactivation occurs or the handover occurs, and therefore implements accurate and continuous data transmission during the carrier aggregation for cells between base stations and reduces a delay in the data transmission.

Figure 9:
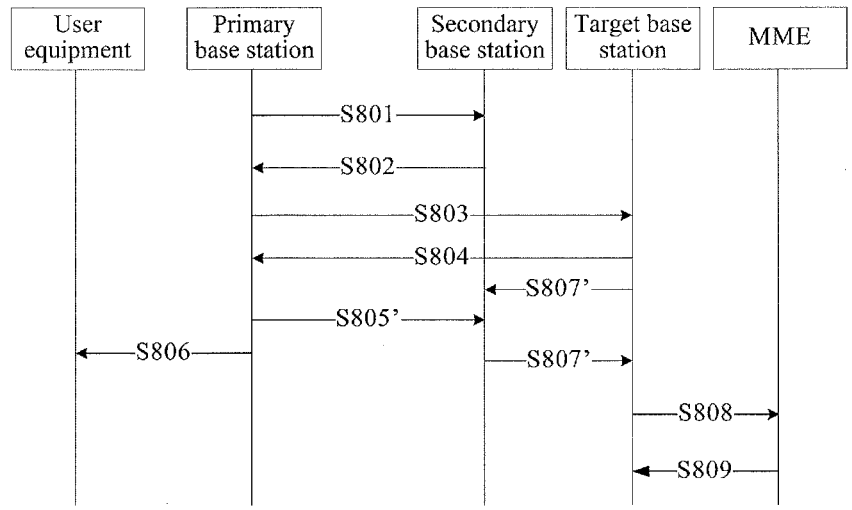
FIG. 9 is a schematic signaling flowchart of another data forwarding method according to an embodiment of the present invention.

A data forwarding method provided by an embodiment of the present invention is shown in FIG. 9. In this embodiment, a primary base station is changed (the primary base station is handed over to a target base station), meanwhile, the primary base station requests a secondary base station to change, and an anchor of data forwarding is placed on the secondary base station.

Steps of this embodiment are generally the same as those of the previous embodiment (an anchor of data forwarding is placed on the primary base station), and differences lie in the following two points:

S805': The primary base station sends a data forwarding start message to the secondary base station, where the message includes GTP endpoint information of the target base station. After receiving the message, the secondary base station should stop sending or scheduling uplink and downlink data.

S807': The secondary base station indicates, to the target base station in an SN Status Transfer message, a sequence number list used for a bearer to forward data, the secondary base station establishes a data forwarding GTP tunnel according to GTP endpoint information, and the secondary base station forwards, to the target base station, a received out-of-order uplink PDCP SDU and/or a downlink PDCP SDU that has not been confirmed by a user equipment.

Such a data forwarding method is applicable to data forwarding when activation/deactivation occurs or handover occurs in the case of carrier aggregation for cells between base stations, which avoids a data loss when the activation/deactivation occurs or the handover occurs, and therefore implements accurate and continuous data transmission during the carrier aggregation for cells between base stations and reduces a delay in the data transmission.

Figure 10:
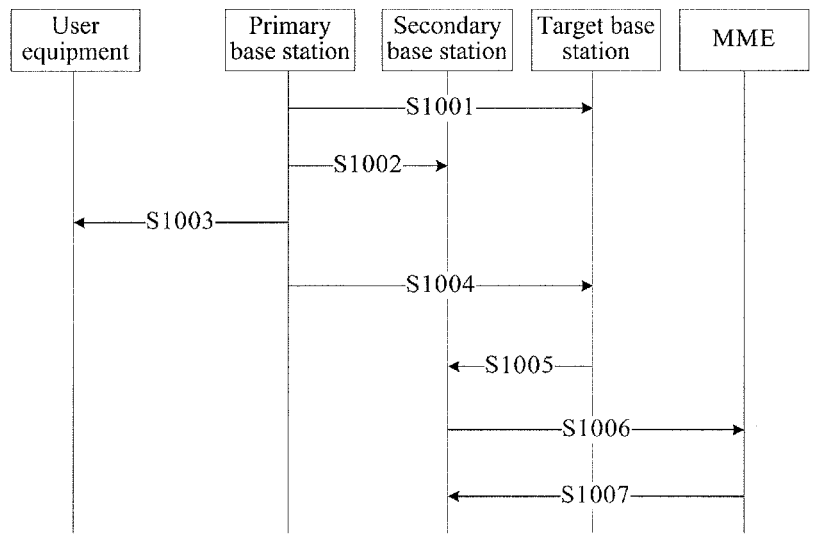
FIG. 10 is a schematic signaling flowchart of another data forwarding method according to an embodiment of the present invention.

As shown in FIG. 10, this embodiment further provides a data forwarding method, where a primary base station is handed over, but a secondary base station remains unchanged. The method includes:

S1001: The primary base station sends a first message to a target base station, where the first message is used to request handover, and the first message includes an identifier of the secondary base station and an instruction that instructs the secondary base station to remain unchanged after the handover, that is, only a bearer on the primary base station is handed over to the target base station, the secondary base station is not handed over, and the secondary base station continues to transmit an original bearer under control of the target base station after the handover succeeds.

Optionally, the primary base station receives a handover confirmation message sent by the target base station.

S1002: The primary base station sends a handover instruction to the secondary base station.

For example, after receiving a handover request confirmation message, the primary base station sends the handover instruction to the secondary base station, to notify the secondary base station that the handover will start and instruct the secondary base station to stop sending uplink and downlink data.

S1003: The primary base station sends a second message to a user equipment.

For example, a handover command may carry the instruction that instructs the secondary base station to remain unchanged, and the bearer on the secondary base station is maintained after the user equipment receives the instruction. For specific internal operations of the user equipment, reference may be made to the foregoing FIG. 6, and details are not described herein again.

For example, the second message may be the handover command, where the handover command may carry the instruction that instructs the secondary base station to remain unchanged, and the bearer on the secondary base station is maintained after the user equipment receives the instruction.

S1004: The target base station receives SN status transfer information sent by the primary base station.

S1005: The target base station sends an activation command to the secondary base station.

For example, after receiving a handover completion message, the target base station sends the activation command to the secondary base station. After receiving the command, the secondary base station starts to transmit the uplink and downlink data.

S1006: The secondary base station sends a path switching request to a mobility management entity MME.

S1007: The secondary base station receives path switching confirmation information sent by the MME, and completes data forwarding.

Such a data forwarding method is applicable to data forwarding when activation/deactivation occurs in the case of carrier aggregation for cells between base stations, which avoids a data loss when the activation/deactivation occurs, and therefore implements accurate and continuous data transmission during the carrier aggregation for cells between base stations and reduces a delay in the data transmission.

Figure 11:
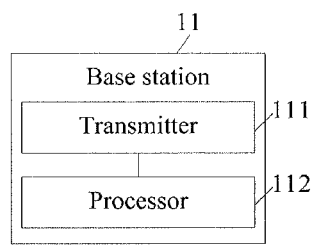
FIG. 11 is a schematic structural diagram of a base station according to an embodiment of the present invention.

A base station 11 provided by an embodiment of the present invention corresponds to the foregoing method embodiments, and as a primary base station, may be used in all of the steps in the foregoing method embodiments. Detailed method steps corresponding to the base station 11 have been described in the foregoing method embodiments, and are not described in detail herein again. As shown in FIG. 11, the base station 11 includes:

a transmitter 111, configured to send a first message to a secondary base station, where the first message is used to instruct the secondary base station to perform handover, and the first message includes an identifier of a target base station; and a processor 112, configured to confirm that the secondary base station forwards data to the target base station; and the transmitter 111, further configured to send a second message to a user equipment, where the second message is used to instruct the user equipment to acquire the data from the target base station.

Further, the first message may further include an identifier of a radio bearer, and the first message is used to instruct the secondary base station to hand over the radio bearer to the target base station according to the identifier of the radio bearer.

Figure 12:
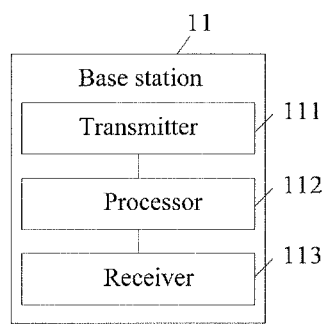
FIG. 12 is a schematic structural diagram of another base station according to an embodiment of the present invention.

As shown in FIG. 12, the base station 11 may further include:

a receiver 113, configured to receive a data forwarding request message sent by the secondary base station, where the data forwarding request message is used to request data forwarding from the primary base station, and the data forwarding request message may include at least one piece of the following information: information that instructs the primary base station to perform downlink forwarding, and uplink general packet radio service Tunneling Protocol GTP endpoint information of the secondary base station for performing uplink data forwarding.

Still further, the transmitter 111 may further be configured to send a data forwarding confirmation message to the secondary base station, where the data forwarding confirmation message includes GTP endpoint information of the primary base station.

The processor 112 may be further configured to determine that the secondary base station performs handover on some of radio access bearers, and the transmitter 111 may be further configured to send a radio access bearer handover message to the secondary base station, so that the secondary base station hands over the some of the radio access bearers to the target base station, where the radio access bearer handover message includes identifiers of the some of the radio access bearers.

Alternatively, the processor 112 may be further configured to determine that the secondary base station performs handover on all radio access bearers, and the transmitter 111 may be further configured to send a secondary base station handover command to the secondary base station, so that the secondary base station hands over all the radio access bearers to the target base station.

It should be noted that, in any one of the following cases, the transmitter 111 sends the first message to the secondary base station:

when the base station confirms that signal quality of the secondary base station is less than a preset threshold; or when the base station receives a radio access bearer handover request sent by the secondary base station; or when the base station confirms that a radio link connection between the user equipment and the secondary base station fails.

By using the foregoing base station, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 13:
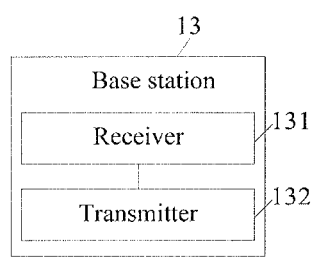
FIG. 13 is a schematic structural diagram of another base station according to an embodiment of the present invention.

A base station 13 provided by an embodiment of the present invention corresponds to the foregoing method embodiments, and as a secondary base station, may be used in all of the steps in the foregoing method embodiments. Detailed method steps corresponding to the base station 13 have been described in the foregoing method embodiments, and are not described in detail herein again. As shown in FIG. 13, the base station 13 includes:

a receiver 131, configured to receive a first message sent by a primary base station, where the first message is used to instruct the base station to perform handover, the first message includes an identifier of a target base station;

the receiver 131, further configured to receive a data forwarding confirmation message sent by the target base station, where the data forwarding confirmation message is used to confirm that the base station forwards data to the target base station; and a transmitter 132, configured to forward a second message to the primary base station, where the second message is used by the primary base station to instruct a user equipment to acquire the data from the target base station.

By using the foregoing base station, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 14:
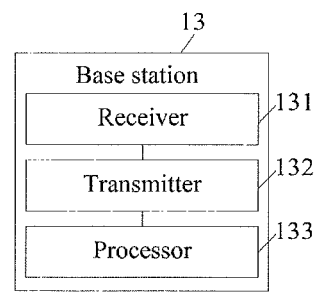
FIG. 14 is a schematic structural diagram of another base station according to an embodiment of the present invention.

Further, as shown in FIG. 14, the base station 13 may further include:

a processor 133, configured to stop transmission of uplink and downlink data.

The transmitter 132 may be further configured to send a data forwarding request message to the target base station, where the data forwarding request message is used to request data forwarding from the target base station, and the data forwarding request message may include at least one piece of the following information: information that instructs the target base station to perform downlink forwarding, and uplink general packet radio service Tunneling Protocol GTP endpoint information of the base station for performing uplink data forwarding.

The data forwarding confirmation message may include GTP endpoint information of the target base station.

Further, when the primary base station determines that the base station performs handover on some of radio access bearers, the receiver 131 may be further configured to receive a radio access bearer handover message sent by the primary base station, and the processor 133 may be further configured to hand over the some of the radio access bearers to the target base station, where the radio access bearer handover message may include identifiers of the some of the radio access bearers.

Alternatively, when the primary base station determines that the base station performs handover on all radio access bearers, the receiver 131 may be further configured to receive a secondary base station handover command sent by the primary base station, and the processor 133 may be further configured to hand over all the radio access bearers to the target base station.

It should be noted that, the primary base station and the target base station may be a same base station.

By using the foregoing base station, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 15:
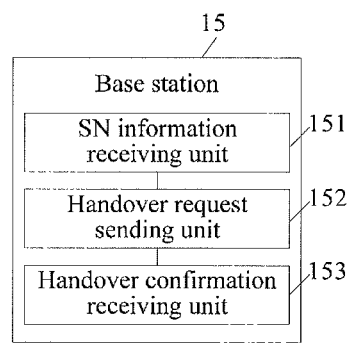
FIG. 15 is a schematic structural diagram of another base station according to an embodiment of the present invention.

A base station 15 provided by an embodiment of the present invention corresponds to the foregoing method embodiments, and as a target base station, may be used in all of the steps in the foregoing method embodiments. Detailed method steps corresponding to the base station 15 have been described in the foregoing method embodiments, and are not described in detail herein again. As shown in FIG. 15, the base station 15 includes:

an SN information receiving unit 151, configured to receive SN status transfer information sent by a secondary base station;

a handover request sending unit 152, configured to send a path switching request to a mobility management entity MME; and a handover confirmation receiving unit 153, configured to receive path switching confirmation information sent by the MME and to complete data forwarding.

By using the foregoing base station, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

Figure 16:
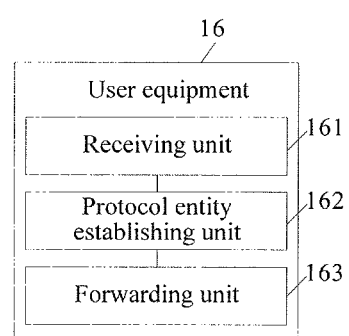
FIG. 16 is a schematic structural diagram of a user equipment according to an embodiment of the present invention.

A user equipment 16 provided by an embodiment of the present invention corresponds to the foregoing method embodiments, and may be used in all of the steps in the foregoing method embodiments. Detailed method steps corresponding to the user equipment 16 have been described in the foregoing method embodiments, and are not described in detail herein again. As shown in FIG. 16, the user equipment 16 includes:

a receiving unit 161, configured to receive a second message sent by a primary base station, where the second message is used to instruct the user equipment to acquire data from a target base station;

a protocol entity establishing unit 162, configured to establish a protocol entity of the target base station according to the second message; and a forwarding unit 163, configured to forward temporarily stored data in a protocol entity of a secondary base station to the protocol entity of the target base station.

By using the foregoing user equipment, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

An embodiment of the present invention further provides a communications system, including the primary base station and the secondary base station that are described above.

The communications system provided by the embodiment of the present invention may further include at least one user equipment, where structures of the base stations and the user equipment have been described in detail in the foregoing embodiments, and details are not described herein again.

By using the foregoing data forwarding system, seamless handover between base stations can be performed in the case of carrier aggregation for cells between base stations, which avoids a data loss when the handover occurs in the case of the carrier aggregation for cells between base stations, and therefore implements accurate and continuous data transmission during the carrier aggregation for cells between base stations and reduces a delay in the data transmission.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data forwarding method, comprising:
sending, by a primary base station, a radio access bearer handover message to a secondary base station to instruct the secondary base station to hand over some of radio access bearers to the primary base station, wherein the radio access bearer handover message comprises identifiers of some of the radio access bearers; and
instructing, by the primary base station, a user equipment to acquire data from the primary base station.

2. The method according to claim 1, wherein the primary base station sends the radio access bearer handover message or the handover command to the secondary base station, when the primary base station confirms that signal quality of the secondary base station is less than a preset threshold.

3. The method according to claim 1, wherein the primary base station confirms that the secondary base station forwards the data to the target base station.

4. The method according to claim 1, wherein the primary base station sends the radio access bearer handover message or the handover command to the secondary base station, when the primary base station receives a radio access bearer handover request sent by the secondary base station.

5. The method according to claim 1, wherein the primary base station sends the radio access bearer handover message or the handover command to the secondary base station, when the primary base station confirms that a radio link connection between the user equipment and the secondary base station fails.

6. A base station, comprising:
a transmitter configured to send a radio access bearer handover message to a secondary base station to instruct the secondary base station to hand over some of radio access bearers to the base station, wherein the radio access bearer handover message comprises identifiers of some of the radio access bearers; and
a processor configured to instruct a user equipment to acquire data from the base station;
wherein the base station is a primary base station.

7. The base station according to claim 6, wherein in any one of following conditions, the transmitter is configured to send the radio access bearer handover message or the handover command to the secondary base station:
  when the base station confirms that signal quality of the secondary base station is less than a preset threshold;
  when the base station receives a radio access bearer handover request sent by the secondary base station; and
  when the base station confirms that a radio link connection between the user equipment and the secondary base station fails.

8. The base station according to claim 6, wherein the processor is further configured to confirm that the secondary base station forwards the data to the target base station.

9. A base station, comprising:
  a receiver configured to receive a radio access bearer handover message from a primary base station to instruct the base station to hand over some of radio access bearers to the primary base station wherein the radio access bearer handover message comprises identifiers of some of the radio access bearers; and
  a transmitter configured to send a message to the primary base station, wherein the message is used to instruct the primary base station to instruct a user equipment to acquire data from the primary base station.

10. The base station according to claim 9, wherein in any one of following conditions, the receiver is configured to receive the radio access bearer handover message or the handover command from the primary base station:
  when the primary base station confirms that signal quality of the base station is less than a preset threshold;
  when the primary base station receives a radio access bearer handover request sent by the base station; and
  when the primary base station confirms that a radio link connection between the user equipment and the base station fails.

11. A data forwarding method, comprising:
  receiving, by a secondary base station, a radio access bearer handover message from a primary base station to instruct the secondary base station to hand over some of radio access bearers to the primary base station, wherein the radio access bearer handover message comprises identifiers of some of the radio access bearers; and
  sending, by the secondary base station, a message to the primary base station, wherein the message instructs the primary base station to instruct the user equipment to acquire data from the primary base station.

12. The method according to claim 11, wherein in any one of following conditions, the secondary base station receives the radio access bearer handover message or the handover command from the primary base station:
  when the primary base station confirms that signal quality of the secondary base station is less than a preset threshold;
  when the primary base station receives a radio access bearer handover request sent by the secondary base station; and
  when the primary base station confirms that a radio link connection between the user equipment and the secondary base station fails.

* * * * *